(12) United States Patent
Otomo et al.

(10) Patent No.: US 11,907,625 B2
(45) Date of Patent: Feb. 20, 2024

(54) COMPUTER SIMULATION OF MULTI-PHASE AND MULTI-COMPONENT FLUID FLOWS INCLUDING PHYSICS OF UNDER-RESOLVED POROUS STRUCTURES

(71) Applicant: Dassault Systemes Simulia Corp., Johnston, RI (US)

(72) Inventors: Hiroshi Otomo, Waltham, MA (US); Rafael Salazar Tio, Waltham, MA (US); Hudong Chen, Waltham, MA (US); Raoyang Zhang, Waltham, MA (US); Andrew Fager, San Francisco, CA (US); Ganapathi Raman Balasubramanian, Waltham, MA (US); Bernd Crouse, Brisbane, CA (US); Hongli Fan, Waltham, MA (US); Jingjing Yang, Waltham, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 473 days.

(21) Appl. No.: 17/136,259

(22) Filed: Dec. 29, 2020

(65) Prior Publication Data

US 2022/0207219 A1    Jun. 30, 2022

(51) Int. Cl.
*G06F 30/28*        (2020.01)
*G06T 7/10*         (2017.01)
(Continued)

(52) U.S. Cl.
CPC ............... *G06F 30/28* (2020.01); *G06T 7/10* (2017.01); *G06F 2111/20* (2020.01); *G06F 2113/08* (2020.01)

(58) Field of Classification Search
CPC .. G06F 30/28; G06F 2111/20; G06F 2113/08; G06F 30/23; G06F 2111/10; G06F 2119/14; G06T 7/10
See application file for complete search history.

(56) References Cited

U.S. PATENT DOCUMENTS

| 3,818,757 A | 6/1974 | Brown |
| 4,498,134 A | 2/1985 | Hansen et al. |
| (Continued) | | |

FOREIGN PATENT DOCUMENTS

| CN | 101556687 | 10/2009 |
| CN | 102174888 | 9/2011 |
| (Continued) | | |

OTHER PUBLICATIONS

G.G. Pereira, "Fluid flow, relative permeabilities and capillary pressure curves through heterogeneous porous media," Applied Mathematical Modelling 75 (2019) 481-493 (Year: 2019).*

(Continued)

*Primary Examiner* — Steven W Crabb
(74) *Attorney, Agent, or Firm* — Fish & Richardson P.C.

(57) ABSTRACT

Disclosed are computer implemented techniques for conducting a fluid simulation of a porous medium. These techniques involve retrieving a representation of a three dimensional porous medium, the representation including pore space corresponding to the porous medium, with the representation including at least one portion of under-resolved pore structure in the porous medium, defining a representative flow model that includes the under-resolved pore structure in the representation, and constructing by the computer system fluid force curves that correspond to fluid forces in the under-resolved pore structure in the representation.

20 Claims, 5 Drawing Sheets

(51) Int. Cl.
*G06F 113/08* (2020.01)
*G06F 111/20* (2020.01)

(56) References Cited

U.S. PATENT DOCUMENTS

| | | | |
|---|---|---|---|
| 4,507,726 A | 3/1985 | Grinberg et al. |
| 4,729,098 A | 3/1988 | Cline et al. |
| 4,809,202 A | 2/1989 | Wolfram |
| 4,831,519 A | 5/1989 | Morton |
| 4,860,245 A | 8/1989 | Kinoshita |
| 4,933,895 A | 6/1990 | Grinberg et al. |
| 4,969,116 A | 11/1990 | Wada et al. |
| 4,989,166 A | 1/1991 | Akasaka et al. |
| 5,038,302 A | 8/1991 | Kaufman |
| 5,069,065 A | 12/1991 | Sprunt et al. |
| 5,159,690 A | 10/1992 | Margolus |
| 5,255,212 A | 10/1993 | Kondoh et al. |
| 5,361,385 A | 11/1994 | Bakalash |
| 5,377,129 A | 12/1994 | Molvig et al. |
| 5,408,638 A | 4/1995 | Sagawa et al. |
| 5,416,729 A | 5/1995 | Leon et al. |
| 5,424,963 A | 6/1995 | Turner et al. |
| 5,432,718 A | 7/1995 | Molvig et al. |
| 5,442,733 A | 8/1995 | Kaufman et al. |
| 5,548,694 A | 8/1996 | Frisken Gibson |
| 5,594,671 A | 1/1997 | Chen et al. |
| 5,605,517 A | 2/1997 | Sherman |
| 5,606,517 A | 2/1997 | Traub et al. |
| 5,640,335 A | 6/1997 | Molvig et al. |
| 5,848,260 A | 12/1998 | Chen et al. |
| 5,953,239 A | 9/1999 | Teixeira et al. |
| 6,318,156 B1 | 11/2001 | Dutton et al. |
| 6,516,080 B1 | 2/2003 | Nur |
| 6,915,245 B1 | 7/2005 | Hinton et al. |
| 6,928,399 B1 | 8/2005 | Watts et al. |
| 7,209,873 B1 | 4/2007 | Kliegel |
| 7,590,514 B1 | 9/2009 | Olovsson |
| 8,583,411 B2 | 11/2013 | Fung |
| 8,757,871 B2 | 6/2014 | Gruebele et al. |
| 9,058,446 B2 | 6/2015 | Lu et al. |
| 9,228,873 B2 | 1/2016 | Crouse et al. |
| 9,507,047 B1 | 11/2016 | Dvorkin et al. |
| 10,101,188 B2 | 10/2018 | Crouse et al. |
| 10,550,690 B2 | 2/2020 | Crouse et al. |
| 10,762,252 B2 | 9/2020 | Gopalakrishnan et al. |
| 11,118,449 B2 | 9/2021 | Crouse et al. |
| 11,651,125 B2 | 5/2023 | Crouse et al. |
| 11,714,040 B2 | 8/2023 | Crouse et al. |
| 2002/0173915 A1 | 11/2002 | Egermann et al. |
| 2005/0182603 A1 | 8/2005 | Freitas et al. |
| 2006/0132131 A1 | 6/2006 | Fleury et al. |
| 2006/0277012 A1 | 12/2006 | Ricard et al. |
| 2007/0016389 A1 | 1/2007 | Ozgen |
| 2007/0112518 A1 | 5/2007 | Montaron |
| 2007/0276639 A1 | 11/2007 | Montaron et al. |
| 2008/0012853 A1 | 1/2008 | Geiger |
| 2008/0044543 A1 | 2/2008 | McClements et al. |
| 2009/0070085 A1 | 3/2009 | Gullapalli et al. |
| 2010/0030534 A1 | 2/2010 | Reich et al. |
| 2010/0128932 A1 | 5/2010 | Dvorkin et al. |
| 2010/0156901 A1 | 6/2010 | Park et al. |
| 2010/0274543 A1 | 10/2010 | Walker |
| 2010/0312535 A1 | 12/2010 | Chen et al. |
| 2011/0184711 A1 | 7/2011 | Altman et al. |
| 2011/0313744 A1 | 12/2011 | Oury et al. |
| 2012/0130639 A1 | 5/2012 | Hanson et al. |
| 2012/0136578 A1 | 5/2012 | Ghedan et al. |
| 2012/0179436 A1 | 7/2012 | Fung |
| 2012/0191432 A1 | 7/2012 | Khataniar et al. |
| 2012/0241149 A1 | 9/2012 | Chen et al. |
| 2012/0310614 A1 | 12/2012 | Beattie et al. |
| 2013/0018641 A1 | 1/2013 | Prisco et al. |
| 2013/0080128 A1 | 3/2013 | Yang et al. |
| 2013/0116997 A1 | 5/2013 | Sun et al. |
| 2013/0151221 A1 | 6/2013 | Chen et al. |
| 2013/0317791 A1 | 11/2013 | Danielson |
| 2014/0019053 A1 | 1/2014 | de Prisco |
| 2014/0067347 A1 | 3/2014 | Gurpinar et al. |
| 2014/0343858 A1 | 11/2014 | Crouse et al. |
| 2015/0048007 A1 | 2/2015 | Weerasooriya et al. |
| 2015/0051892 A1 | 2/2015 | Carvajal et al. |
| 2015/0059447 A1 | 3/2015 | Rickards |
| 2015/0066463 A1 | 3/2015 | Shetty et al. |
| 2015/0141303 A1 | 5/2015 | Harwell et al. |
| 2015/0142407 A1 | 5/2015 | Wakefield et al. |
| 2015/0149139 A1 | 5/2015 | Chavez et al. |
| 2015/0268080 A1 | 9/2015 | Crouse et al. |
| 2016/0003010 A1 | 1/2016 | Fornel et al. |
| 2016/0188768 A1 | 6/2016 | Gopalakrishnan et al. |
| 2016/0209256 A1 | 7/2016 | Crouse et al. |
| 2016/0307359 A1 | 10/2016 | Desbrun et al. |
| 2017/0074770 A1 | 3/2017 | Fourno |
| 2017/0198573 A1 | 7/2017 | Kim et al. |
| 2018/0329112 A1 | 1/2018 | Lee et al. |
| 2018/0120213 A1 | 5/2018 | Dyshlyuk et al. |
| 2018/0253514 A1 | 9/2018 | Bryant et al. |
| 2019/0025461 A1 | 1/2019 | Wiener |
| 2019/0050508 A1 | 2/2019 | Crouse et al. |
| 2019/0086250 A1 | 3/2019 | Crouse et al. |
| 2019/0154597 A1 | 5/2019 | Zhang |
| 2019/0186255 A1 | 6/2019 | Mustapha |
| 2019/0203593 A1 | 7/2019 | Fullmer et al. |
| 2019/0212241 A1 | 7/2019 | Crouse et al. |
| 2019/0368344 A1 | 12/2019 | Crouse et al. |
| 2020/0063532 A1 | 2/2020 | Crouse et al. |
| 2021/0062638 A1 | 3/2021 | Crouse et al. |
| 2021/0406434 A1 | 12/2021 | Gopalakrishnan et al. |
| 2022/0414295 A1 | 12/2022 | Crouse et al. |
| 2023/0077778 A1 | 3/2023 | Crouse et al. |

FOREIGN PATENT DOCUMENTS

| | | |
|---|---|---|
| CN | 102245289 | 11/2011 |
| CN | 102472649 | 5/2012 |
| CN | 103698102 | 4/2014 |
| CN | 104067290 | 9/2014 |
| CN | 104334828 | 2/2015 |
| CN | 102383783 | 6/2015 |
| CN | 104849765 | 8/2015 |
| CN | 105393110 | 3/2016 |
| CN | 105580019 | 5/2016 |
| CN | 105910996 | 8/2016 |
| CN | 106233146 | 12/2016 |
| EP | 0228915 | 7/1987 |
| GB | 2066466 | 7/1981 |
| JP | 2011191848 | 9/2011 |
| JP | 2011525271 | 9/2011 |
| JP | 2016524222 | 8/2016 |
| WO | WO 1991017204 | 11/1991 |
| WO | WO 1992001993 | 2/1992 |
| WO | WO 1999034308 | 7/1999 |
| WO | WO 2008021652 | 2/2008 |
| WO | WO 2012071090 | 5/2012 |
| WO | WO 2016159807 | 10/2016 |
| WO | WO 2019097272 | 5/2019 |

OTHER PUBLICATIONS

Extended European Search Report in European Appln No. 21212490. 3, dated May 23, 2022, 8 pages.
Pereira, "Fluid Flow, Relative Permeabilities and Capillary Pressure Curves Through Heterogeneous Porous Media," Applied Mathematical Modelling, May 31, 2019, vol. 75, p. 481-493.
CN Office Action in Chinese Appln. No. 201980012848.7, dated Feb. 1, 2023, 27 pages (with English translation).
Dixit et al., "Pore-scale modeling of wettability effects and their influence on oil recovery," SPE Reservoir Evaluation & Engineering, Feb. 1999, 2(1) 25-36.
EP Office Action in Europe Appln. No. 19738994.3, dated Sep. 21, 2022, 11 pages.
JP Office Action in Japanese Appln. No. 2020538656, dated Dec. 5, 2022, 16 pages (with English translation).

(56) References Cited

OTHER PUBLICATIONS

Morgan, et al., "A Parametric Investigation of Oblique Shockwave/Turbulent Boundary Layer Interaction Using LES," 41st AIAA Fluid Dynamics Conference and Exhibit, Jun. 2011, pp. 1-19.
U.S. Appl. No. 07/555,754, filed Jul. 12, 1990, Molvig.
U.S. Appl. No. 07/812,881, filed Dec. 20, 1991, Molvig.
Bao et al., "Lattice Boltzmann method for fluid simulations," Department of Mathematics, Courant Institute of Mathematical Sciences, New York University, Apr. 14, 2011, 44:1-16.
Bryant et al., "Prediction of relative permeability in simple porous media" Physical Review A vol. 46, No. 4 Aug. 15, 1992) (Year: 1992).
Burges et al., "Buoyant Mixtures of Cellular Automation Gases," Complex Systems, 1:31-50 (1987).
Catala, et al. "Fluid Flow Fundamentals." Oilfield Review, Dec. 31, 1996, 61-64.
Chatterjee et al., "A hybrid lattice Boltzmann model for solid-liquid phase transition in presence of fluid flow," Physics Letters A, Mar. 6, 2006, 351(4-5):359-367.
Chen & Ohashi, "The foundation and its application of the lattice Boltzmann method," Simulation, Nippon-Steel Technical Information Center, Ltd., Sep. 15, 1998, 17(3): 43-49 (with abstract).
Chen et al., "Lattice Boltzmann method for fluid flows," Annual review of fluid mechanics, Jan. 1998, 30(1):329-64.
Chen et al., "Lattice Boltzmann Model for Stimulation of Magnetohydordynamicis," Physical Review Letters, vol. 67,No. 27 (Dec. 1991), pp. 3776-3779.
Chopard et al., Cellular Automata Model for Heat Conduction in a Fluid, Physics Letters A, vol. 126, Nos. 8, 9, pp. 476-480 (Jan. 1988).
Clougueur et al., "RAPI, A Cellular Automaton Machine for Fluid Dynamics," Complex Systems, pp. 585-597 (1987).
CN Office Action in Chinese Appln. No. 201480049496.X; dated Dec. 18, 2017; 18 pages (with English translation).
Demianov et al., "Density Functional Modelling in Multiphase Compositional Hydrodyanmics" Canadian J. Chem. Engine., Apr. 2011. 89:206-26.
D'Humieres et al., "2-D and 3-D Hydrodynamics on Lattice Gases," Fruhjahrstagung der Schweiz. Physikalischen Gesellschaft, vol. 59 (1986).
D'Humieres et al., "Lattice Gas Models for 3D Hydrodynamics," 2 (4), pp. 291-297 (1986).
D'Humieres et al., Numerial Simulations of Hydrodynamics with Lattice Gas Automata in Two Dimensions, Complex Systems 1:599-632 (1987).
Dyn et al., "Optimizing 3D Triangulations Using Discrete Curvature Analysis," Mathematical Methods for Curves and Surfaces: Oslo Jan. 1, 2001, 1:135-146.
Fredkin et al., "Conservative Logic." International Journal of Theoretical Pysics, vol. 21, Nos. 3/4, pp. 219-253 (1982).
Frisch et al., "Lattice Gas Hydrodynamics in Two and Three Dimensions." Complex Systems 1:649-707 (1987).
Frisch et al., "Lattice-Gas Automata for the Navier-Stokes Equation," Physical Review Letters, vol. 56, No. 14, pp. 1505-1508 (Apr. 1986).
Ginzburg et al., "Analysis and improvement of Brinkman lattice Boltzmann schemes: Bulk, boundary, interface. Similarity and distinctness with finite elements in heterogeneous porous media" Physical Review, 2015, 91:023307-1-32.
Google Search Results, Jun. 28, 2021, 1 pp. (Year: 2021.
Hamedi et al., "Pore-scale investigation of phase distribution and residual-oil development during secondary and tertiary solvent injection," SPE Reservoir Evaluation & Engineering. Feb. 1, 2015, 18(01):39-52.
Han et al., "Modelling of thermal contact resistance within the framework of the thermal lattice Boltzmann method," International Journal of Thermal Sciences, Oct. 1, 2008, 47(10):1276-1283.
Hardy et al., "Molecular Dynamics of a Classical Lattice Gas: Transport Properties and Time Correlation Functions." Physical Review A, vol. 13, No. 5, pp. 1949-1961 (May 1976).
Hasslacher, Discrete Fluids: Part I: Background for Lattice Gas Automata, Los Alamos Science Special Issue, pp. 175-217 (1987).
Healy et al., "Status of Miscible Flooding Technology," 14th World Petroleum Congress, Jan. 1, 1994, 407-409.
Henon, "Isometric Collision Rules for the Four-Dimensional FCHC Lattice Gas," Complex Systems 1:475-494 (1987).
Hoshen & Kopelman, "Percolation and cluster distribution. I. Cluster multiple labeling technique and critical concentration algorithm," Physical Review B, Oct. 15, 1976, 14:8:3438-3445.
Huang et al.; "Shan-and-Chen Type Multiphase Lattice Boltzmann Study of Viscous Coupling Effects for Two-Phase Flow in Porour Media," International Journal for Numerical Methods in Fluids, Sep. 30, 2009; 61(3):341-354.
Jiang et al, "Estimation of three-phase relative permeability by simulating fluid dynamics directly on rock-microstructure images," Jan. 5, 2017, 22 pages.
Kadanoff et al., "Transport Coefficients Near the Critical Point: A Master Equation Approach," 165 Phys. Review 310 (1968).
Kadanoff, "On Two Levels" Physics Today (Sep. 1986).
Karsch, "Lattice simulations of the thermodynamics of strongly interacting elementary particles and the exploration of new phases of matter in relativistic heavy ion collisions," InJournal of Physics: Conference Series 2006 , 46(1):122-131.
Kaufman et al "Volume Graphics." IEEE, Jul. 1993, pp. 51-64.
Klein, "Negative Absolute Temperatures." Physical Review, vol. 104, No. 3, p. 589 (Nov. 1956).
Kovscek et al., "A Pore-Leval Scenario for the Development of Mixed-Wettability in Oil Reservoirs," Earth Science Division of Lawrence Berkeley Laboratory and Department of Chemical Engineering, prepared for U.S. Department of Energy, Sep. 1992, 1-58.
Krummel et al. "Visualizing Multiphase Flow and Trapped Fluid Configurations in a Model Three-Dimensional Porous Medium" ( Year: 2013).
Ladd et al., "Lattice-Boltzmann simulations of particle-fluid suspensions," Journal of statistical physics, Sep. 1, 2001, 104(5-6):1191-251.
Lee et al. "A stable discretization of the lattice Boltzmann equation for simulation of incompressible two-phase flows at high density ratio," Journal of Computational Physics, Jun. 10, 2005, 206(1):16-47.
Lenormand et al., "Physics of Blob Displacement in a Two-Dimensional Porous Medium, " Mar. 1988, SPE Formation Evaluation, pp. 271-275.
Li et al. "GPU-based numerical simulation of multi-phase flow in porous media using multiple-relaxation-time lattice Boltzmann method" (Year: 2013).
Li et al., "Upscaled Lattice Boltzmann Method for Simulations of Flows in Heterogeneous Porous Media," Geofluids, Feb. 2017, 2017:1-12.
Lin et al., "Plasma Simulation Using the Massively Parallel Processor," NASA CP-2478, pp. 185-191 (Jul. 1987).
Man et al., "Pore Network Modelling of Electrical Resistivity and Capillary Pressure Characteristics", Transport in Porous Media, Dec. 2000, 41(3):263-285.
Margolus et al., "Cellular-Automata Supercomputers for Fluid-Dynamics Modeling." Physical Review Letters, vol. 56, No. 16, pp. 1694-1696 (Apr. 1986).
Martys et al., "Multiscale modeling of fluid transport in heterogeneous materials using discrete Boltzmann methods," Materials and Structures, Dec. 2002, 35:650-9.
Mohammadmoradi et al., "Petrophysical Characterization of Porous Media Starting from Micro-Tomographic Images", Advances in Water Resources, May 2016, 35 pages.
Mohanty et al., Physics of Oil Entrapment in Water-Wet Rock, Feb. 1987, SPE Reservoir Engineering, pp. 113-128 (Year: 1987).
Molvig et al., "Fluid CAD That Challenges Computational Fluid Dynamics," Machine Design, Dec. 1994, 66(23):96-8.
Molvig et al., "Multi-species Lattice-Gas Automata for Realistic Fluid Dynamics," Springer Proceedings in Physics, vol. 46, pp. 206-231 (1990) (abstract only).
Molvig et al., "Removing the Discreteness Artifacts in 3D Lattice-Gas Fluids", Proceedings of the Workshop on Discrete Kinetic

(56) References Cited

OTHER PUBLICATIONS

Theory, Lattice Gas Dynamics, and Foundations of Hydrodynamics, World Scientific Publishing Co., Pte., Ltd., Singapore (1989).
Motealleh et al., "Unified Model of Drainage and Imbibition in 3D Fractionally Wet Porous Media" Transport in Porous Media, Jul. 2013, 99(3):581-611.
One Petro Search Results, Jan. 26, 2021, 11 pp. (Year: 2021).
Pepiot et al., "Numerical analysis of the dynamics of two- and three-dimensional fluidized bed reactors using an Euler-Lagrange approach," Powder Technology, Apr. 1, 2012, 220: 104-121.
Perez et al., "OUPPI-1, ASIMD Computer Using Integrated Parallel Processors." Proc. of Compar Conf. Papers Plenary Sess. and Stream a Manchester, Sep. 12-16, 1988, British Comp. Soc. Parallel Proc. Spec. Group GB.
Petkov et al., "Efficient LBM visual simulation on face-centered cubic lattices," IEEE Transactions on Visualization and Computer Graphics, Feb. 27, 2009, 15(5):802-14.
petrowiki.org/Miscible_flooding [online] "Miscible flooding" Aug. 19, 2013, retrieved on Oct. 10, 2019, retrieved from URL <https://petrowiki.org/Miscible_flooding>, 9 pages.
Prodanovic et al., "Investigating Matrix-Fracture Transfer via a Level Set Method for Drainage and Imbibition"; SPE Journal, vol. 15, No. 01; Mar. 1, 2010; 17 pages.
Prodanovic et al., "Physics-Driven Interface Modeling for Drainage and Imbibition in Fractures," Sep. 2009 SPE Journal, pp. 532-542 (Year: 2009).
Qian et al., "Lattice BGK Models for Navier-Stokes Equation." Europhysics Letters, 17(6):479-484 (1992).
Raabe, "Overview of the lattice Boltzmann method for nano-and microscale fluid dynamics in materials science and engineering," Modelling and Simulation in Materials Science and Engineering, Sep. 16, 2004, 12(6):R13-R46.
Ramsey, "Thermodynamics and Statistical Mechanics at Negative Absolute Temperatures." Physical Review, vol. 103, No. 1, pp. 20-28 (Jul. 1956).
Ramstad et al., "Relative Permeability Calculations from Two-Phase Flow Simulations Directly on Digital Images of Porous Rocks" Transp Porous Med (2012) 94:487-504 (Year: 2012).
Ramstad et al., "Simulation of two-phase flow in reservoir rocks using a lattice Boltzmann method," Spe Journal, Dec. 1, 2010, 15(04):917-27.
Rivet, "Three-Dimensional Lattice Gas Hydrodynamical Simulations: First Results." C.R. Acad. Sci. Paris, t. 305, Series II, pp. 751-756 (1987).
Rosenblum, "Photorealistic Terrain Imaging and Flight Simulation," IEEE, 1994 pp. 10-12.
Sheng et al., "Numerical Prediction of Relative Permeability from MicroCT Images: Comparison of Steady-State versus Displacement Methods," Oct. 30-Nov. 2, 2011, SPE Annual Technical Conference and Exhibition, Denver, Colorado, 16 pages.
Sohrabi et al., "Novel Insights into the Pore-scale Mechanisms of Enhanced Oil Recovery by CO2 Injection," 74th EAGE Conference and Exhibition, Jun. 4, 2012, 154529:1-14.
Sohrabi et al., "Visualisation of residual oil recovery by near-miscible gas and SWAG injection using high-pressure micromodels," Transport in Porous Media, Sep. 1, 2008, 74(2):239-57.
Suhrer et al., "Upscaling Method for Obtaining Primary Drainage Capillary Pressure andResistivity Index with Digital Rock Physics,"IPTC-20035-Abstract, 2020, 13 pages.
Teixeira, "Continuum Limit of Lattice Gas Fluid Dynamics." B.A. Sc. Engineering Science University of Toronto (1988).
Toffoli, "Cellular Automata as an Alternative to (Rather Than an Approximation of) Differentiation Equation in Modeling Physics." Physica 10D: 117-127 (1984).
Tsuji et al., "Characterization of immiscible fluid displacement processes with various capillary numbers and viscosity ratios in 3D natural sandstone," Advances in Water Resources, Sep. 1, 2016, 95:3-15.
Tucker, "Cellular Automata Machine: The Ultimate Parallel Computer," High Technology, pp. 85-87 (Jun. 1984).
Van Den Pijl, "Computation of bubbly flows with a mass-conserving level-set method," Dissertation at Delft University of Technology, Nov. 22, 2005, 139 pages.
Vichniac, "Cellular-Automata Fluids." Instabilities and Nonequilibrium Structures II, pp. 97-116 (1989).
Vichniac, "Stimulating Physics with Cellular Automata." Physica, 10D:96-110, 1984 (abstract only).
Wijk et al., "Three Ways to Show 3D Fluid Flow" IEEE Computer Graphics and Applications, Sep. 1994, 14(5):33-9.
Wolfram, "Cellular Automation Fluids 1: Basic Theory," J. Stat. Phys., vol. 45, Nos. 3/4, pp. 471-526 (1986).
Xu et al., "Continuous vs Discontinuous Capillary Desaturation and Implications for IOR/EOR," InPaper SCA2018-066 presented at at the International Symposium of the Society of Core Analysts held in Trondheim, Norway, Aug. 2018, 1-10.
Yiotis et al., "Blob population dynamics during immiscible two-phase flows in reconstructed porous media," Physical Review E, Mar. 4, 2013, 87(3):1-11.
Zhang et al., "Single Component, Multiphase Fluids Flow Simulation in Porous Media with Lattice Boltzmann Method" 2012 Fourth International Conference on Computational and Information Sciences (Year: 2012).
Zhu et al., "Extending a Gray Lattice Boltzmann Model for Simulating Fluid Flow in Multi-Scale Porous Media," Sci. Rep., Apr. 2018, 8(5826):1-19.
U.S. Appl. No. 18/317,473, filed May 15, 2023, Crouse et al.
Office Action in Japanese Appln. No. 2020-538656, dated Jul. 21, 2023, 6 pages (with English translation).

\* cited by examiner

COMPUTER SIMULATION OF MULTI-PHASE AND MULTI-COMPONENT FLUID FLOWS INCLUDING PHYSICS OF UNDER-RESOLVED POROUS STRUCTURES

BACKGROUND

Multi-component fluid flows through porous regions is an important characteristic of hydrocarbon reservoir rocks and a crucial input to oil and gas industries, as well as other industries.

Numerical simulation of multi-component fluid flows in porous regions with complex solid structures is of great importance in many industrial applications, for example, Enhanced Oil Recovery (EOR) and Personal Protective Equipment (PPE). In order to achieve accurate simulation results, it is important to capture relevant data from all scales of a porous structure.

For many porous materials, the range of scales ranges is often across many orders magnitude in size. In addition, the range of scales are often heterogeneously distributed in space. A fully scale-resolved simulation of such a porous structure is computationally prohibitive both in terms of data size and computational time and computational resources. Thus, often such a simulation is limited to a sample of a size that is significantly smaller portion of the original porous material of interest. The latter may compromise on the statistical representation or limit the type of porous materials studied.

SUMMARY

According to an aspect, a computer implemented method for conducting a fluid simulation of a porous medium includes retrieving by a computing system a representation of a three dimensional porous medium, the representation including pore space corresponding to the porous medium, with the representation including at least one portion of under-resolved pore structure in the porous medium, defining by the computing system, a representative flow model that includes the under-resolved pore structure in the representation, and constructing by the computer system fluid force curves that correspond to fluid forces in the under-resolved pore structure in the representation.

Embodiments of the method can include any one or more of the following features or other features as disclosed herein.

The representation of the three-dimensional porous medium is obtained from a three-dimensional image to which a three-dimensional segmentation is applied. The under-resolved pore structure belongs to a class of under-resolved pore structures that are represented by a common description for all elements of the class, also referred as PM type. The method further includes simulating fluid flow through the porous medium, and when detecting an under-resolved pore structure, accessing a model of the under-resolved pore structure, and applying the fluid force curves to the under-resolved pore structure.

Applying further includes applying the fluid force curves according to local pore space data. The local pore space data comprises local porosity, local orientation/spatial gradient of the local porosity that are obtained from the representation of the three-dimensional porous media.

The method further includes calculating by the computing system, fluid force curves from precomputed physical properties, including absolute permeability, relative permeability and capillary pressure curves of the under resolved pore structure in the representation based on the local pore space data.

Calculating further includes calculating physical properties, including absolute permeability, relative permeability and capillary pressure curves via simulation of a set of fully resolved subdomains of the under-resolved pore scales in the representation based on the local pore space data.

The method further includes storing in a repository or library parametric models for the physical properties that have parameters fitted to simulation data or adjusted according to subject expert matter knowledge.

The representation is of a physical rock sample, the representation including pore space and grain space data corresponding to the physical porous rock sample, porous particle filter, and similar physical porous media.

According to an additional aspect, a computer system includes one or more processor devices, memory coupled to the one or more processor devices, storage storing executable computer instructions for conducting a fluid simulation of a porous medium, the instructions to configure the one or more processors to retrieve a representation of a three dimensional porous medium, the representation including pore space corresponding to the porous medium, with the representation including at least one portion of under-resolved pore structure in the porous medium, define a representative flow model that includes the under-resolved pore structure in the representation, and construct fluid force curves that correspond to fluid forces in the under-resolved pore structure in the representation.

Embodiments of the computer system can include any one or more of the following features or other features as disclosed herein.

The representation of the three-dimensional porous medium is obtained from a three-dimensional image to which a three-dimensional segmentation is applied.

The system is further configured to simulate fluid flow through the porous medium, and when detecting an under-resolved pore structure, access a model of the under-resolved pore structure and apply the fluid force curves to the under-resolved pore structure.

The local pore space data comprises local porosity, local orientation/spatial gradient of the local porosity that are obtained from the representation of the three-dimensional porous media.

According to an additional aspect, a computer program product tangibly stored on a computer readable non-transitory storage device that stores executable computer instructions to conduct a fluid simulation of a porous medium, the instructions for causing a computing system to retrieve a representation of a three dimensional porous medium, the representation including pore space corresponding to the porous medium, with the representation including at least one portion of under-resolved pore structure in the porous medium, define a representative flow model that includes the under-resolved pore structure in the representation, and construct fluid force curves that correspond to fluid forces in the under-resolved pore structure in the representation.

Embodiments of the computer program product can include any one or more of the following features or other features as disclosed herein.

The computer program product further includes instructions to calculate fluid force curves from precomputed physical properties, including absolute permeability, relative permeability and capillary pressure curves of the under resolved pore structure in the representation based on the local pore space data.

The computer program product further includes instructions to calculate physical properties, including absolute permeability, relative permeability and capillary pressure curves via simulation of a set of fully resolved subdomains of the under-resolved pore scales in the representation based on the local pore space data.

The computer program product further includes instructions to store in a repository or library parametric models for the physical properties that have parameters fitted to simulation data or adjusted according to subject expert matter knowledge.

The computer program product further includes instructions to simulate fluid flow through the porous medium; and when detecting an under-resolved pore structure, access a model of the under-resolved pore structure, and apply the fluid force curves to the under-resolved pore structure.

One or more of the above aspects may provide one or more of the following advantages.

The numerical approach described herein enables multi-component fluid flow simulations of a multi-scale porous structure, while avoiding extremely expensive computational costs that are inherent in a fully scale-resolved simulation of the multi-scale porous structure. This numerical approach introduces locally, proper forces that act on the fluid components using complete set(s) of pre-calculated physical properties applicable to the under-resolved region (s) of the multi-scale porous structure. The usage of physical properties for representative porous structures, in general, saves significant computational costs, while keeping a reasonable degree of accuracy.

The proposed approach is applicable to the Lattice Boltzmann Method, as well as other computational fluid-dynamics methods including finite-volume method, finite-element method, etc. The stored physical properties in a representative solid structure can be extensively applied to any spatial scale and various fluid conditions, such as viscosity, surface tension, and surface wettability, because the properties can be stored in phenomenological non-dimensional form.

Other features and advantages of the invention will become apparent from the following description, and from the claims.

DETAILED DESCRIPTION

Figure 1:
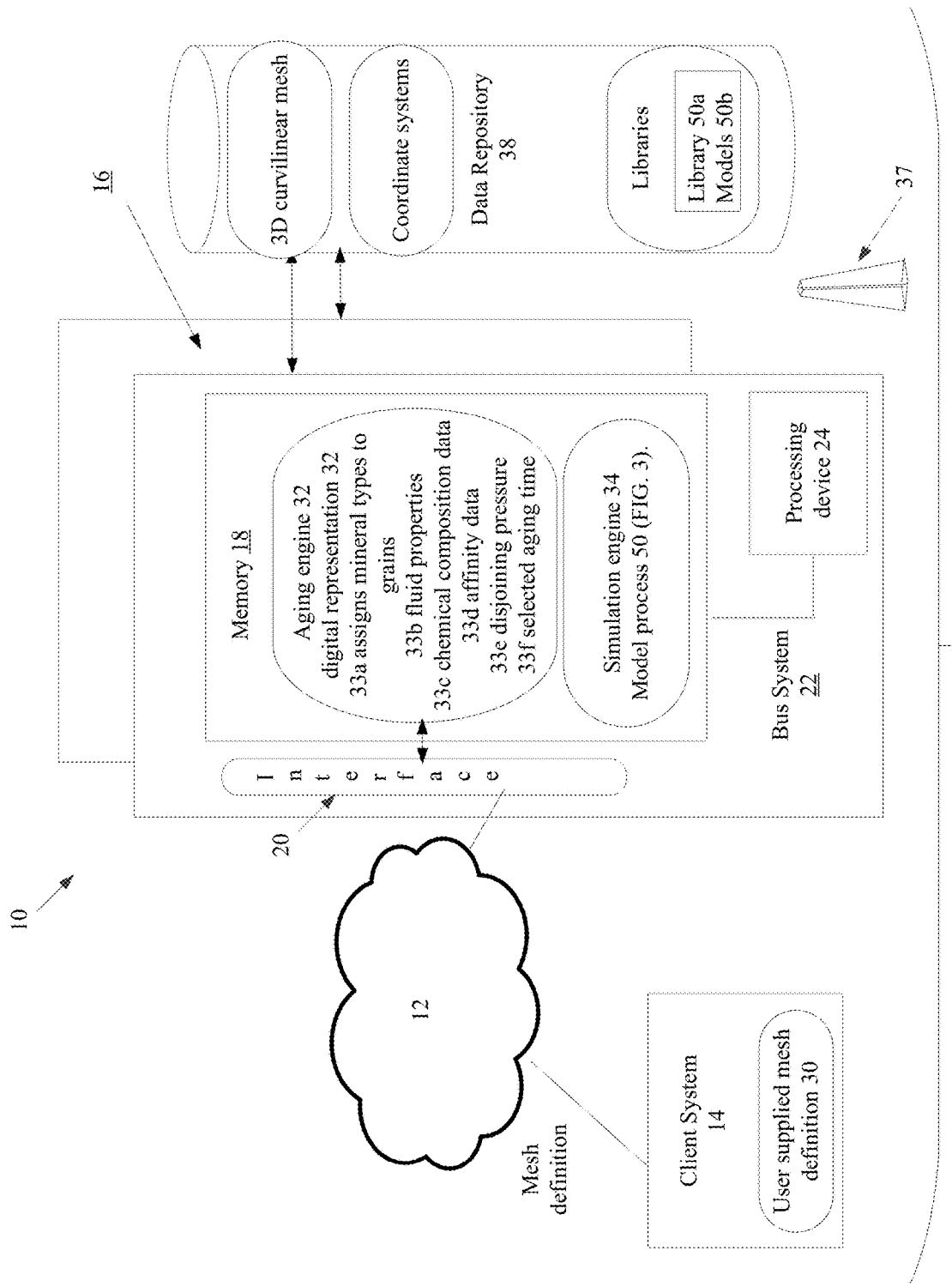
FIG. 1 depicts a system for simulation of a multi-scale porous structure using models that have locally, proper forces applicable to under-resolved region(s) of the multi-scale porous structure.

Referring to FIG. 1, a system 10 for conducting a simulation of a multi-scale porous material having under-resolved region(s) of the multi-scale porous material. The simulation can be for various purposes such as to simulate a "wettability restoration" or an "aging" process representative of a subsurface reservoir conditions, i.e., "numerical aging." Other simulations can include the effect of a vapor stream on PPE, and the like.

The focus of the discussion herein will be on simulation of a multi-scale porous material having under-resolved region(s). In general, the system 10 in this implementation is based on a client-server or cloud based architecture and includes a server system 12 implemented as a massively parallel computing system 12 (stand alone or cloud-based) and a client system 14. The server system 12 includes memory 18, a bus system 11, interfaces 20 (e.g., user interfaces/network interfaces/display or monitor interfaces, etc.) and a processing device 24.

For the example of the wettability alternation, in memory 18 are a numerical aging engine 32 that operates on a digital representation of a physical rock sample that digitally represents a pore space and grain space of the digital representation of the physical material, e. g., a physical rock sample (digital rock sample). Also in memory is a simulation engine 34 that simulates wettability alteration using the simulation of the multi-scale porous material having under-resolved region(s).

In some embodiments, simulating multi-phase flow behavior occurs through a reservoir rock adjacent a gas or oil well (e.g., drilling rig 37), using the simulation of the multi-scale porous material having the under-resolved region(s). Determining the multi-phase flow behavior comprises determining the wettability alteration of the physical rock sample.

The digital representation of the physical rock sample can be a third party application that is executed on a different system than server 12. The system 10 merely requires the digital representation of a physical rock sample 32' to have the numerical aging engine digitally prepare the digital representation of a physical rock sample. One approach to providing the digital representation 32' of the rock sample is to obtain the representation 32', for example, from a 3D image generated from a micro CT scan of the rock sample.

For complete details on a simulation process please refer to US Patent Applications titled: "Multi-Phase Flow Visualizations Based On Fluid Occupation Time," Ser. No. 15/880,867, filed Jan. 26, 2018, and assigned to the assignee of the current application. For other exemplary cases please see US Patent Applications titled: "Determining Fluid Flow Characteristics Of Porous Mediums," Ser. No. 16/243,285, filed Jan. 9, 2019; or US Patent Applications titled: "Determination Of Oil Removed By Gas Via Miscible Displacement In Reservoir Rock," Ser. No. 16/545,387, filed Aug. 20, 2019, both of which are assigned to the assignee of the current application.

The memory 18 may store parameters used by the engine 32. In particular parameters used for the case entitled "Determination Of Oil Removed By Gas Via Miscible Displacement In Reservoir Rock," could include grain surface properties obtained by assigning mineral types 33$a$ to the grains to determine the surface properties for each of those mineral types, and surface texture and roughness properties, for one or more of the above applications of the disclosed subject matter. The memory 18 may also store parameters such as fluid properties 33$b$, e.g., fluid density and viscosity of each expected fluid, (e.g., two or more of water, gas, oil) and fluid-fluid interfacial tension properties. The memory 18 also stores parameters such as chemical composition data 33$c$ of the fluids and affinity data 33$d$ of the fluid components for the particular mineral types. The memory 18 also stores disjoining pressure 33*e* for each mineral type in combination with the fluids, and a selected 33*f* aging time used by the aging engine 32. In addition, reservoir pressure and temperature data are also stored. The mineral types evaluated can be those found or expected at the actual site of the reservoir.

The simulation engine 34 includes a module to set up the rock sample simulation environment, a module to perform a drainage/imbibition simulation, and a module to calculate local curvature of surfaces in the pore space. The simulation engine also includes a module 50 that performs processing of the multi-scale porous material having under-resolved region(s).

The system 10 accesses a data repository 38 that stores 2D and/or 3D meshes, coordinate systems, and libraries that can be used for drainage/imbibition simulations using any well-known computational technique such as computational fluid dynamics or the so called Lattice Boltzmann method. In addition, the system 10 accesses a library 50*a* that includes models 50*b* that represent the under-resolved regions.

Figure 2B:
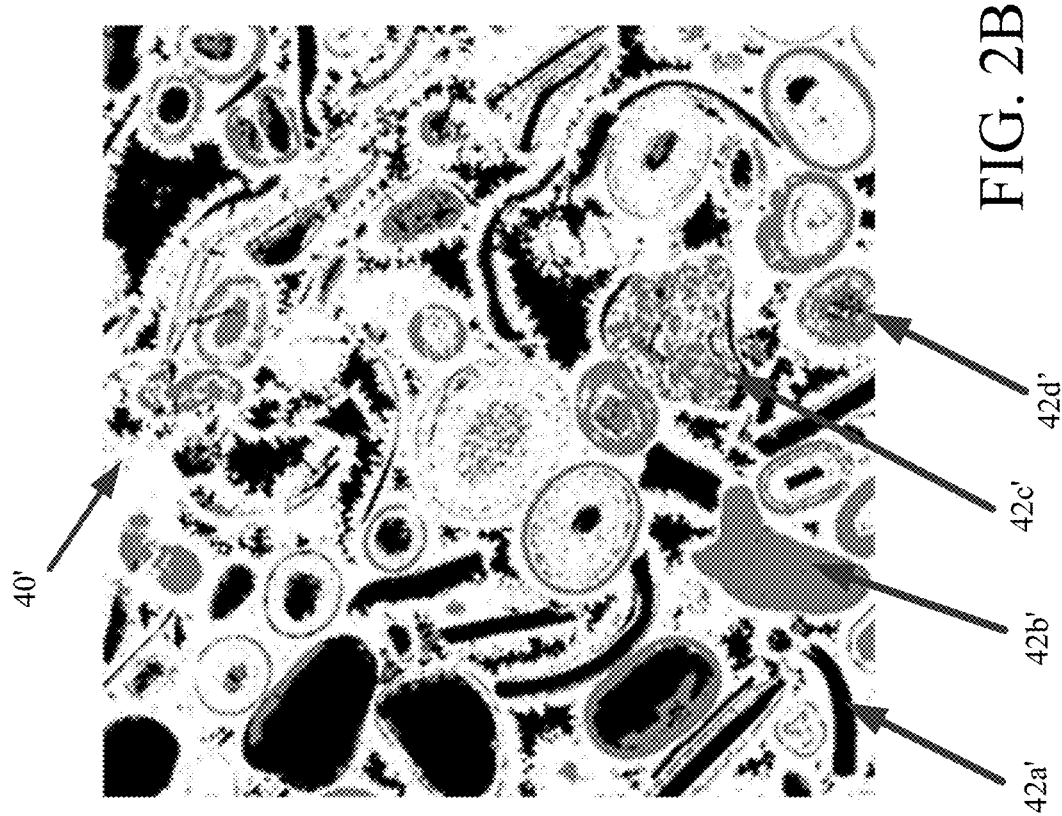
FIGS. 2A, 2B depict a cross-sectional view of a carbonate rock with an original scanned image (FIG. 2A) and a segmented image (FIG. 2B) showing small scale porous regions marked in gray.
Figure 2A:
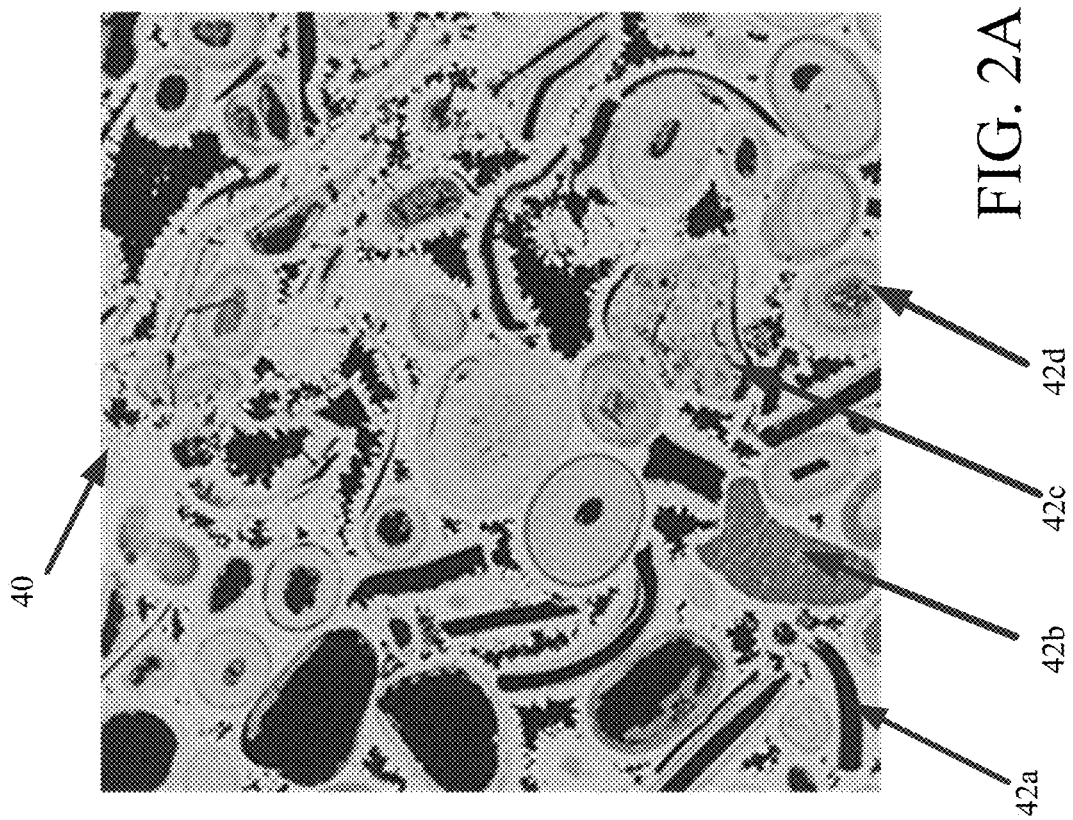

FIGS. 2A and 2B illustrate an example of a porous medium having under-resolved regions that is obtained from a sub-surface porous medium for oil and gas applications. FIG. 2A is an original scanned image. FIG. 2A shows a typical cross section of a carbonate-rock sample 40 that has solid structures with multiple different scales and, which shows small-scale porous structures three of which are denoted as 42.

FIG. 2B is a corresponding segmented image 40' of the carbonate-rock sample 40 (FIG. 2A) that shows small-scale porous structures three of which are denoted as 42' marked in grey. The length-scale difference between black and grey structures is approximately 10 times. Since the small scale porous regions in grey could impact the flow behavior in a significant way, it is necessary to properly take their contributions into account. A portion of FIG. 2B is denoted by a phantom line 44', and is further discussed in FIG. 4.

However, resolving all of such small scale details requires extremely fine resolutions, that results in a tremendously expensive computational simulation. The costs of such a simulation could increase by 10s of thousand times, compared to the unresolved case by simulating the grey regions, because of the increased number of three-dimensional cells and the reduction of time increments. Therefore, such fully resolved simulations are impractical for most industrial applications.

The process 50 simulates the original porous material having various sizes including under-resolved small scales, without the need to resolve all of the under-resolved small scales involved in the original porous material. The physical characteristics of these under-resolved small scales are properly incorporated in establishment of a process described below.

The process 50 for addressing the aforementioned challenges of multi-component fluid-flow simulation with under-resolved porous structure involves a novel workflow, in which a fluid-flow simulation only resolves a porous sample down to a certain scale level. However, data contributions from under-resolved porous regions 42' (grey regions in FIG. 2B) are taken into account by numerical models. The essential idea is to recognize that the effect of the under-resolved porous regions on the flow is a set of forces, such as viscous, pressure, and capillary forces. The numerical models reproduce such forces as acting on the resolved fluid, by using local representative physical properties such as absolute permeability, relative permeability and capillary-pressure-saturation curves.

These physical properties are obtained via simulation of a fully resolved much smaller subdomains of the original porous material that is representative of the small-scale unresolved grey porous regions, or are generated by user-calibrated parametric functional forms. Sets of these physical properties are stored in a library. Each set of physical properties represents a flow type for a particular under-resolved porous structure. In each grey region, a set of physical properties of the porous type from the library is chosen and assigned for the model during the simulation with under-resolved porous structures. By taking into account the local porous geometry information including porosity (the ratio of pore space to total volume) and directionality of the structure, the local under-resolved flow behavior can be properly reproduced.

Figure 3:
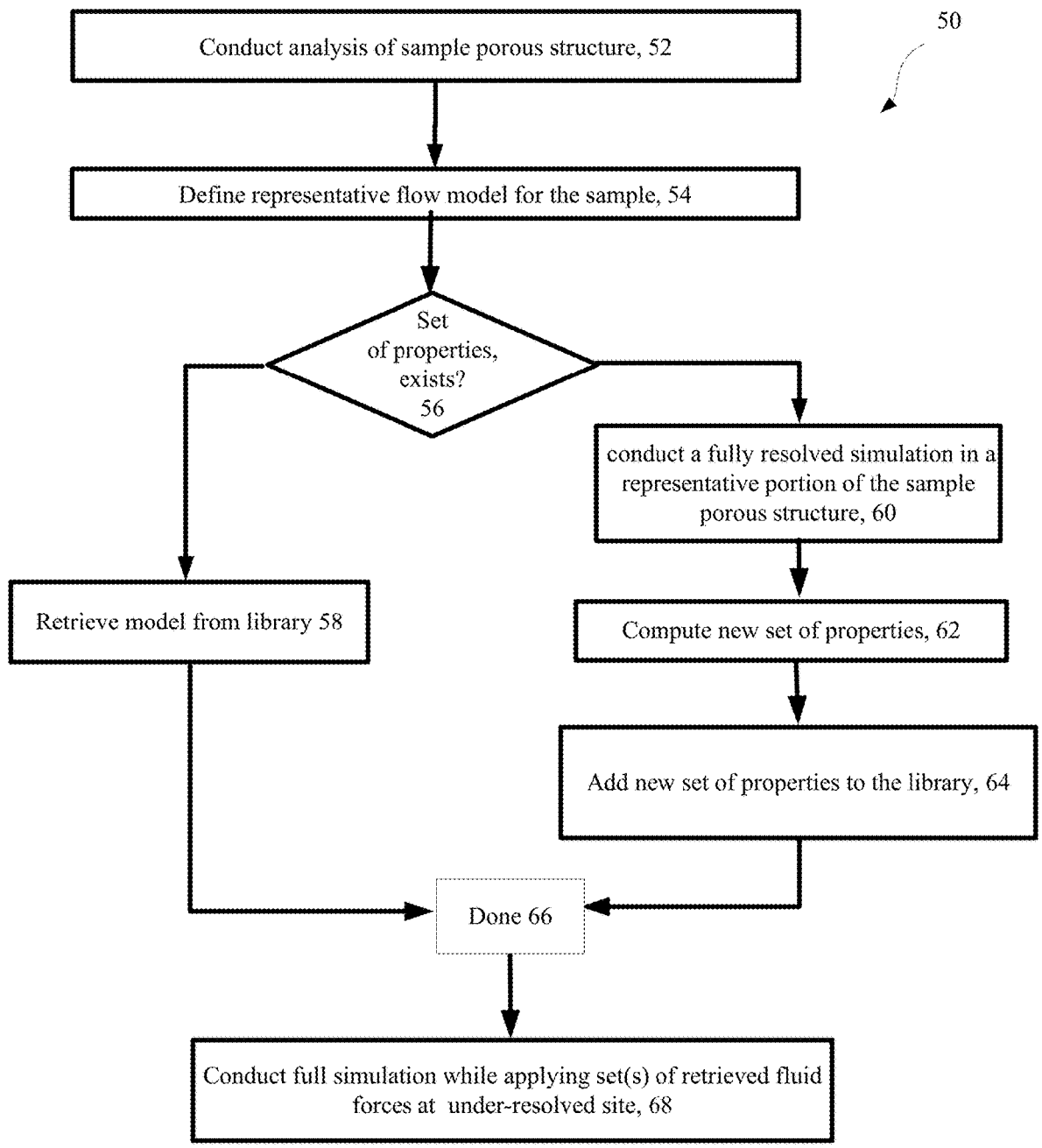
FIG. 3 depicts a flow chart showing operations for a multi-component fluid flow simulation with under-resolved porous structures.

Referring now to FIG. 3, the process 50 for conducting a multi-component fluid-flow simulation with under-resolved porous structure is shown. The process 50, uses a simulation of a porous rock sample as an example. Process 50 includes conducting 52 a geometrical analysis of a typical porous structure, using scanned images to identify various types of under-resolved porous structures that are encountered in the porous structure being studied. The types of under-resolved porous structures are used to define 54 representative flow models for each gray region. As a model is defined, the defined model is compared to existing models that are stored in the library of models. Essentially, the models are defined as including sets of physical properties. If a corresponding set of physical properties already exists in the library 56, the model including the set of physical properties are retrieved 58 from the library.

If the set of properties does not exist, the process conducts 60 a fully-resolved simulation 62 in a representative sub-domain of the gray region, and computes 64 a new set of physical properties that include absolute permeability, relative permeability, and capillary-pressure-saturation curves for the particular type of porous structure being modeled. These sets of physical properties describe the effective multi-phase flow behavior of a porous media structure. Upon computation of the new set of physical properties, the now computed model is added 66 to the library and labeled for the particular under-resolved simulation conducted.

The process 50 determines 66 if all under-resolved sites have been completed (done) using the local geometry information and physical properties. These proper fluid forces correspond to the viscous, pressure and capillary forces from the under-resolved solid structure.

Segmentation

Figure 4:
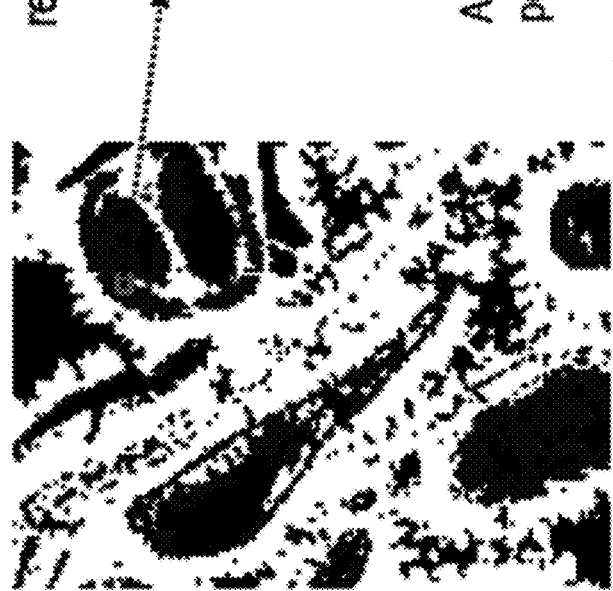
FIG. 4 depicts an image showing different types of under-resolved porous structures.
Figure 4:
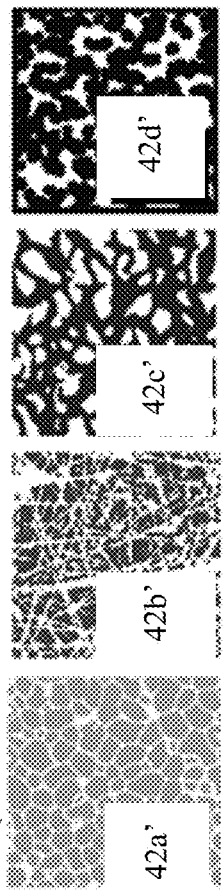
Figure 4:
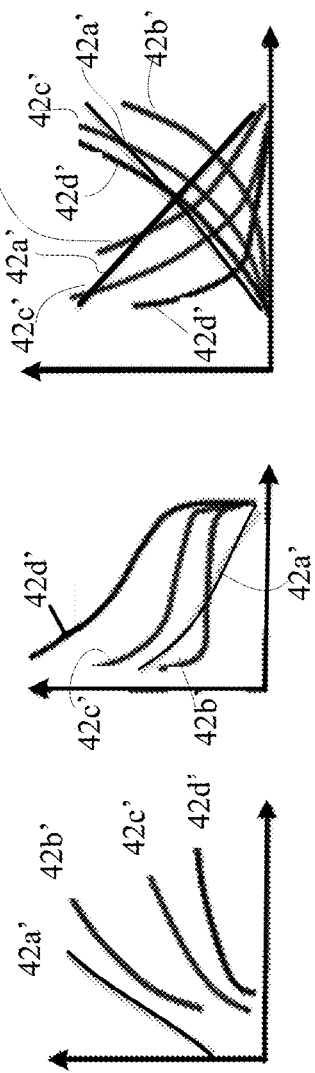

Referring now to FIG. 4, there are various ways to define numerical models for fluid forces in the under-resolved region. Through image analysis (segmentation), a three-dimensional image analysis can define different types of under-resolved porous regions.

The three-dimensional image analysis (segmentation) is applied to the three-dimensional image. As shown in FIG. 4, upon segmentation, the under-resolved porous regions 42*a'* to 42*d'* are illustrated from a portion of FIG. 2B.

Different materials have different x-ray attenuation coefficients. Grey-scale values can be used to classify pixels according to material types (e.g., minerals, fluids, etc.). When a pixel contains sub-resolution pores, the x-ray attenuation is an average of solid and pore fractions within the pixel (partial volume effect).

Additional textural features can be used to segment pixels into different porous media (PM) types, for example:

Cellular structure (42*a'*)
Fibrous structure (42*b'*)

Micro-porous clay (42c')
Micro porous dolomite (42d')
Absolute Permeability Absolute permeability is simulated by the single-phase flow Lattice Boltzmann (LB) solver, for example. In general, the simulation output for a macroscopic 3D model is a permeability tensor with 3×3 values. The established similarity between macroscopic output and microscopic PM pixel input, in general, should be a tensor as well. However, in the majority of cases, the tensor can be approximated by a single permeability vs. porosity function k (Ø), sometimes complemented by a local orientation that can be computed from the image itself.

For example, in the "micro-porous dolomite" PM type (42d'), pores are small compared with the pixel-size, and the internal structure is homogeneous and isotropic. In this case there is no preferential direction and the PM permeability can be described completely by a single curve, the PM permeability tensor for this pixel will be the identity matrix multiplied by k (Ø).

Figure 5:
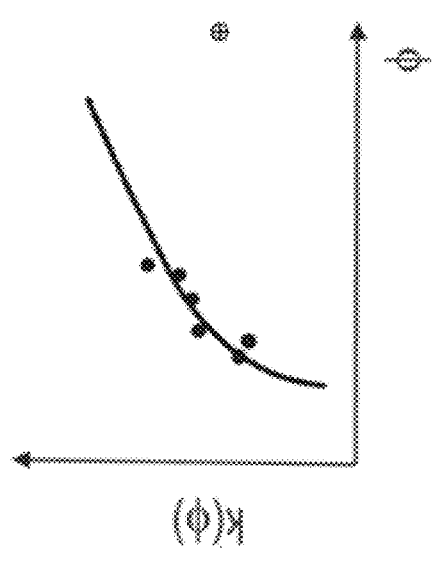
FIG. 5 depicts a relationship between permeability vs. porosity.

If a nano-scale model of "micro-porous clay" PM type is available, for example from Focused Ion-Beam (FIB) images, permeability simulations for different sub-volumes can be used to produce a permeability vs. porosity relationship, ($\phi$), as illustrated in FIG. 5.

In another example, a "single channel" PM type, there is a strong directional dependence for permeability. The preferential direction will vary locally, depending on the local orientation of the sub-resolution channels in the image. Local orientation can be computed from the image itself, for instance, from local derivatives of the grey-scale values.

In this case as well, a single permeability curve can be used as input, and the local image orientation information will be used to modulate the values in a given direction.

In order to account for flow for arbitrary orientations, the LB flow solver needs to compute all contributions to the flow. Local resistivity coefficients relating velocities and pressure gradients at different directions can be used to implement the permeability tensor effects in a PM pixel. For example, for flow in the y direction induced by a pressure gradient in the x direction, we use the resistivity coefficient Ryx: which directly relates to the corresponding permeability tensor element kyx. Here $\rho$ is the fluid density, and $v$ is the dynamic viscosity.

$$\Delta P_x = \rho u_y R_{yx} = \frac{u_y \mu}{k_{yx}}$$

$$R_{yx} = \frac{\mu}{\rho k_{yx}} = \frac{v}{k_{yx}}$$

The process 50 uses the set of physical properties for the PM regions to simulate in turn the physical properties of the multiscale model.

One possible example, for the viscous force $\vec{F}_{PM\_vis}^{\sigma}$ can be defined using the absolute permeability $K_0$ and relative permeability $K_r^{\sigma}$ as, $$\vec{F}_{PM\_vis}^{\sigma} = -\frac{v^{\sigma}}{K_0 K_r^{\sigma}} \rho^{\sigma} \vec{u}^{\sigma},$$

where $\sigma$ is an index for components and $v$ is the kinematic viscosity. Here, $\rho$ and $\vec{u}$ are density and velocity of fluid flow, respectively. Also, $K_0$ and $K_r^{\sigma}$ are the function of the porosity $\phi$ and density ratio of fluid components under an assumption of homogeneous solid structure for under-resolved porous region.

Solver can be seen as an extension of the Brinkman equation.

Capillary Pressure

Mercury intrusion capillary pressure (MICP) measurements are typically used to determine porous media capillary pressure behavior independent of wettability effects.

In general, when wettability is considered and using reservoir fluids (oil/water) instead mercury, there should be an irreducible water saturation Swi for drainage and some residual oil saturation Sor for imbibition. The amounts of fluids Sw+So=1, water/oil, present in the PM pixel for different pressure gradients Po−Pw=$P_c(S_w)$, depends on the capillary radius $r_c$ size distribution, and wettability fluids-solid properties.

Figure 6:
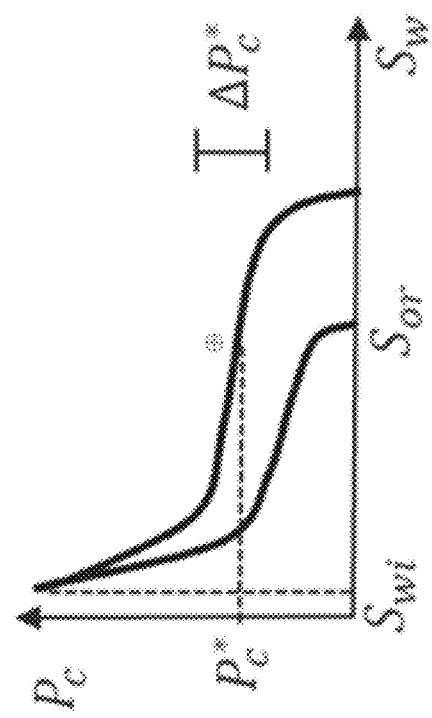
FIG. 6 depicts a model curve of drainage/imbibition capillary pressure vs. water saturation.

In the model curve depicted in FIG. 6, Pc* represents the drainage threshold pressure, and ΔPc* represents the spread on the pore size distribution. In order to model the imbibition behavior, a second curve is included with a different threshold pressure and corresponding spread.

There are several capillary pressure-saturation models in the literature. For example there is the Thomeer, Brooks and Corey, Bentsen and Anli, models. For instance, in the Thomeer model, the capillary pressure relates to saturation by:

$$P_c(S_w) = P_c^* e^{\frac{\Delta P_c^*}{ln(S_w/S_{wi})}}$$

The capillary pressure behavior of each PM type can be represented by such parametrized curves, may be based on sub-volume capillary simulation results of a fully-resolved model of the PM type, similarly to the absolute permeability example.

In order to model the porosity variability within a given PM type (similar to permeability), we can use the Leverett J-function (Sw), which consolidates capillary curves for different samples from the same rock type in to a single curve:

$$J(S_w) = \frac{P_c}{\sigma \cos\theta} \sqrt{\frac{k}{\phi}}$$

In general, a J-function (Sw) should be given for each PM type. Then, for each individual PM pixel, with a sub-resolution porosity $\phi$, the corresponding permeability is estimated from (Ø). With these two values, an individual Pc, can be estimated from the J-function for this PM type, at the required saturation Sw.

Furthermore, in non-isotropic cases, like the "single channel" PM type, an anisotropic P(Sw), could be computed for each direction by using the corresponding element of the permeability tensor in the J-function calculation.

Thus, for pores that are smaller than the pixel size, the capillary pressure behavior can be modelled by J-function calibrated using specific PM type relationships $P_c(S_w)$.

A solver implementation can include an additional force in the direction of flow proportional to P(Sw), such that the oil/water saturations So, Sw in each PM pixel satisfy $$P_o - P_w = P_c(S_w)$$

$$S_w + S_o = 1$$

for drainage, and another relation for imbibition in case Po>Pw.

An example for definition of capillary force $\vec{F}_{PM\_cap}{}^\sigma$ can be written as, $$\vec{F}_{PM\_cap}^\sigma = -\frac{2\sigma\cos\theta J}{\sqrt{K_0 K_r^\sigma/\phi}} (\widehat{\nabla \rho^{\sigma_1}}) \cdot G(At, |\partial_x(At)|),$$

where the "hat" notation " $\longrightarrow$ " indicates the unit vector, and θ is the contact angle of the under-resolved porous solid. Here, J is the Leverett J-function, $P_c \sqrt{K_0 K_r^\sigma/\phi}/\sigma \cos\theta$, that is the normalized capillary function of density ratio of the fluid components, and $\sigma_1$ is an index of a corresponding component. A function G is a 'switch function' that depends on the local multi-component interface information. Here, $$At = (\rho^{\sigma_1} - \rho^{\sigma_2})/(\rho^{\sigma_1} + \rho^{\sigma_2}).$$

The switch function 'G' is used for the diffusive multi-component model because its non-zero interface thickness may cause an excessive artificial force. Moreover, this definition may not cover a scenario where a component fluid is confined in an under-resolved cell. In order to mitigate this problem, an additional model can be implemented using the Leverett J-function and local pressure.

Relative Permeability

Following the same approach as for absolute permeability and capillary pressure, relative permeability curves for PM types can be computed from nano-scale models and used as library inputs for PM pixel behavior.

The Corey model is a common parametrization of relative permeability curves where:

$$k_{rw} = k_{rw,ro}\left[\frac{S_w - S_{wi}}{1 - S_{wi} - S_{or}}\right]^{n_w}$$

$$k_{ro} = k_{ro,wi}\left[\frac{1 - S_w - S_{or}}{1 - S_{wi} - S_{or}}\right]^{n_o}$$

and, $k_{rw,ro}$ is the water relative permeability at residual oil saturation Sor, while $k_{ro,wi}$ is the oil relative permeability at irreducible water saturation Swi.

When the physical properties in a representative porous structure are applied to an under-resolved site, the local preferential direction of the structure can be taken into account in the following manner.

Orientation of a local solid structure is computed from the image, for instance, from the local derivative of the grey-scale values. By comparing such a structure orientation and orientation of the principle axis of permeability, the physical properties are modulated in a proper direction. In the following discussion, the case of absolute permeability is shown.

The modulated tensorial formed absolute permeability $K_{0,\alpha\beta}$ in three dimensions is computed as, $$\begin{bmatrix} e_{1x} & e_{2x} & e_{3x} \\ e_{1y} & e_{2y} & e_{3y} \\ e_{1z} & e_{2z} & e_{3z} \end{bmatrix} \cdot \begin{bmatrix} k_1 & 0 & 0 \\ 0 & k_2 & 0 \\ 0 & 0 & k_3 \end{bmatrix} = \begin{bmatrix} K_{0,xx} & K_{0,xy} & K_{0,xz} \\ K_{0,yx} & K_{0,yy} & K_{0,yz} \\ K_{0,zx} & K_{0,zy} & K_{0,zz} \end{bmatrix}$$

where $e_{ij}$ are the elements of the local rotation matrix in three dimensions and the values $k_i$ are the values of absolute permeability along the principle axis. One way to compute $e_{ij}$ is considering the three-dimensional rotation from the principle axis to the axis of the local orientation. Similarly, the relative permeability $K_{r,\alpha\beta}{}^\sigma$ and the Leverett J-function are also modulated. The viscous force is thus evaluated as:

$$F_{PM\_vis,\alpha}^\sigma = -\frac{\nu^\sigma}{K_{0,\alpha\beta}K_{r,\alpha\beta}^\sigma}\rho^\sigma u_\beta^\sigma.$$

Here, the equation is written with the Einstein notation instead of the vector notation using indices for spatial directions, α and β. The matrix in the denominator indicates the invert matrix.

The numerical approach described herein enables multi-component fluid flow simulations in a multi-scale porous structure, while avoiding extremely expensive computational costs that are inherent in a fully scale-resolved simulation of such the multi-scale porous structure. This numerical approach introduces locally proper forces that act on the fluid components using complete set(s) of pre-calculated physical properties applicable to the under-resolved region (s) of the multi-scale porous structure. The multi-scale simulation becomes feasible without sacrificing significant computational efficiency while achieving relatively accuracy in comparison to either the fully scale-resolved simulation or avoiding simulation of multi-scales in such a multi-scale porous structure.

The usage of physical properties in few representative porous structures for extensive under-resolved regions in general saves significant computational costs, more effectively, while keeping a reasonable degree of accuracy. The degree of accuracy results because the numerical approach described herein takes into consideration the local variation of the individual structures, via modulation, that is based on local porosity and directionality, both of which are estimated directly from the image.

Both the under-resolved simulation with coarse resolution and the prior fully resolved simulation in the sub grey region with fine resolution for capturing the physical properties can be performed with a single fluid-dynamics solver. Use of the single fluid-dynamics solver is highly beneficial with respect to the consistence of the simulation process. That is, because any computational methods exhibit more or less peculiar numeric aspects, which can cause issues when these are connected to other methods. By using a consistent solver in the simulation process can circumvent such problem effectively.

The proposed approach is applicable to the Lattice Boltzmann Method, as well as other computational fluid-dynamics methods including finite-volume method, finite-element method, etc.

The stored physical properties in a representative solid structure can be extensively applied to any spatial scale and various fluid conditions, such as viscosity, surface tension, and surface wettability, because the properties can be stored in phenomenological non-dimensional form. By phenomenological is meant that the properties are constructed from the results of experiments and/or simulations. Simulated physical properties in a certain multi-scale solid structure can be used as an input for a case at even a larger scale. Accordingly, by detecting the hierarchal structures and categorizing the structure types, this approach can be extensively applied to highly complex geometries possessing structures at various scales.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices.

Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

What is claimed is:

1. A computer implemented method for conducting a fluid simulation of a porous medium, comprises:

accessing, from memory, a three dimensional digital image of a three dimensional porous medium;

performing, by a computer system, image processing on the accessed three dimensional digital image;

based on performing the image processing, generating, by the computer system, a representation of the three dimensional porous medium, the representation including pore space corresponding to the porous medium;

determining, by the computer system, that the representation includes at least one portion of under-resolved pore structure in the porous medium, the under-resolved pore structure having a pore size smaller than a resolution of the fluid simulation; and digitally constructing by the computer system, a visual representation of fluid force curves that correspond to fluid forces in the under-resolved pore structure in the representation.

2. The method of claim 1 wherein performing image processing on the accessed three dimensional digital image comprises applying a three dimensional segmentation to the three dimensional digital image.

3. The method of claim 1 wherein the under-resolved pore structure belongs to a class of under-resolved pore structures that are represented by a common description for all elements of the class, also referred as porous media (PM) type.

4. The method of claim 1, further comprises:
   simulating fluid flow through the porous medium; and
   when detecting an under-resolved pore structure,
   accessing a model of the under-resolved pore structure; and
   applying the fluid force curves to the under-resolved pore structure.

5. The method of claim 4 wherein applying further comprises:
   applying the fluid force curves according to local pore space data.

6. The method of claim 5 wherein the local pore space data comprises local porosity, local orientation/spatial gradient of the local porosity that are obtained from the representation of the three dimensional porous medium.

7. The method of claim 6, further comprises:
   calculating by the computing system, fluid force curves from precomputed physical properties, including absolute permeability, relative permeability, and capillary pressure curves of the under resolved pore structure in the representation based on the local pore space data.

8. The method of claim 7 wherein calculating further comprises:
   calculating physical properties, including absolute permeability, relative permeability and capillary pressure curves via simulation of a set of fully resolved subdomains of the under-resolved pore scales in the representation based on the local pore space data.

9. The method of claim 7, further comprises:
   storing in a repository or library parametric models for the physical properties that have parameters fitted to simulation data or adjusted according to subject expert matter knowledge.

10. The method of claim 1 wherein the representation is of a physical rock sample, the representation including pore space and grain space data corresponding to the physical rock sample, porous particle filter, and similar physical porous media.

11. The computer implemented method of claim 1 further comprising:
    defining by the computing system, a representative flow model of the under-resolved pore structure that includes one or more physical properties of the under-resolved pore structure in the representation.

12. A computer system comprises:
one or more processor devices;
memory coupled to the one or more processor devices;
storage storing executable computer instructions for conducting a fluid simulation of a porous medium, the instructions to configure the one or more processors to:
access, from memory, a three dimensional digital image of a three-dimensional porous medium;
perform image processing on the accessed three dimensional digital image;
based on performing the image processing, generate a representation of the three dimensional porous medium, the representation including pore space corresponding to the porous medium;
determine that the representation includes at least one portion of under-resolved pore structure in the porous medium, the under-resolved pore structure having a pore size smaller than a resolution of the fluid simulation; and
digitally construct a visual representation of fluid force curves that correspond to fluid forces in the under-resolved pore structure in the representation.

13. The system of claim 12 wherein the instructions to perform image processing on the accessed three dimensional digital image comprise applying a three dimensional segmentation to the three dimensional digital image.

14. The system of claim 12, further configured to:
simulate fluid flow through the porous medium; and when detecting an under-resolved pore structure,
access a model of the under-resolved pore structure; and
apply the fluid force curves to the under-resolved pore structure.

15. The system of claim 14 wherein apply further comprises apply the fluid force curves according to local pore space data, the local pore space data comprises local porosity, local orientation/spatial gradient of the local porosity that are obtained from the representation of the three dimensional porous medium.

16. A computer program product tangibly stored on a computer readable non-transitory storage device that stores executable computer instructions to conduct a fluid simulation of a porous medium, the instructions for causing a computing system to:
access, from memory, a three dimensional digital image of a three-dimensional porous medium;
perform image processing on the accessed three dimensional digital image;
based on performing the image processing, generate a representation of the three dimensional porous medium, the representation including pore space corresponding to the porous medium;
determine that the representation includes at least one portion of under-resolved pore structure in the porous medium, the under-resolved pore structure having a pore size smaller than a resolution of the fluid simulation; and
digitally construct a visual representation of fluid force curves that correspond to fluid forces in the under-resolved pore structure in the representation.

17. The computer program product of claim 16, further comprising instructions to:
calculate fluid force curves from precomputed physical properties, including absolute permeability, relative permeability and capillary pressure curves of the under resolved pore structure in the representation based on local pore space data.

18. The computer program product of claim 16, further comprising instructions to:
calculate physical properties, including absolute permeability, relative permeability, and capillary pressure curves via simulation of a set of fully resolved subdomains of the under-resolved pore scales in the representation based on local pore space data.

19. The computer program product of claim 18, further comprising instructions to:
store in a repository or library parametric models for the physical properties that have parameters fitted to simulation data or adjusted according to subject expert matter knowledge.

20. The computer program product of claim 16, further comprising instructions to:
simulate fluid flow through the porous medium; and when detecting an under-resolved pore structure,
access a model of the under-resolved pore structure; and
apply the fluid force curves to the under-resolved pore structure.

* * * * *

UNITED STATES PATENT AND TRADEMARK OFFICE
CERTIFICATE OF CORRECTION

| | | |
|---|---|---|
| PATENT NO. | : 11,907,625 B2 | Page 1 of 1 |
| APPLICATION NO. | : 17/136259 | |
| DATED | : February 20, 2024 | |
| INVENTOR(S) | : Hiroshi Otomo et al. | |

It is certified that error appears in the above-identified patent and that said Letters Patent is hereby corrected as shown below:

In the Claims

Column 12, Line 14, in Claim 1 delete "constructing" and replace with --constructing,--.

Signed and Sealed this
Ninth Day of April, 2024

Katherine Kelly Vidal
*Director of the United States Patent and Trademark Office*